(12) United States Patent
Wallace

(10) Patent No.: US 6,247,262 B1
(45) Date of Patent: Jun. 19, 2001

(54) FLOAT FISHING DEVICE

(75) Inventor: Marcus T. Wallace, Smyrna, TN (US)

(73) Assignee: P & M Services, Inc., Murfreesboro, TN (US)

( * ) Notice: Subject to any disclaimer, the term of this patent is extended or adjusted under 35 U.S.C. 154(b) by 0 days.

(21) Appl. No.: 09/357,618

(22) Filed: Jul. 20, 1999

(51) Int. Cl.[7] ........................ A01K 91/00; A01K 91/053; A01K 93/00
(52) U.S. Cl. .......................................... 43/43.11; 43/42.74
(58) Field of Search .................................. 43/43.1, 43.11, 43/43.15, 4.5, 18.1, 27.4, 27.74, 44.87, 44.9

(56) References Cited

U.S. PATENT DOCUMENTS

| | | | |
|---|---|---|---|
| 1,915,208 | * | 6/1933 | Walthers .............................. 43/43.11 |
| 2,547,308 | * | 4/1951 | Dean ..................................... 43/17.6 |
| 2,551,998 | * | 5/1951 | De Groot ................................ 294/66 |
| 2,924,039 | * | 2/1960 | Morton ............................... 43/43.11 |
| 3,183,620 | * | 5/1965 | Dockal ............................... 43/42.74 |
| 3,184,879 | * | 5/1965 | Ruhl ................................... 43/42.74 |
| 3,190,029 | * | 6/1965 | Bondi ................................. 43/42.74 |
| 3,214,858 | * | 11/1965 | Louie ................................... 43/41.2 |
| 3,745,692 | * | 7/1973 | McGee ............................... 43/42.74 |
| 5,222,317 | * | 6/1993 | Georgescu .......................... 43/42.74 |
| 5,361,532 | * | 11/1994 | Moff ..................................... 43/44.9 |
| 5,797,209 | * | 8/1998 | Nicholas ............................ 43/42.74 |
| 6,029,391 | * | 2/2000 | Holley ................................ 43/43.11 |

OTHER PUBLICATIONS

Declaration of Marcus T. Wallace (not prior art).

* cited by examiner

*Primary Examiner*—Kurt Rowan
(74) *Attorney, Agent, or Firm*—Waddey & Patterson; Lucian Wayne Beavers

(57) ABSTRACT

A fishing apparatus includes a buoyant collapsible pole assembly which has first and second elongated buoyant poles connected by a pivotal connection. The pivotal connection allows the first and second poles to pivot between an extended position wherein the poles extend in opposite directions from the pivotal connection, and a folded position wherein the poles extend in the same direction from the pivotal connection. A plurality of line storage and dispensing stations are attached to the pole assembly at spaced locations along the pole assembly.

14 Claims, 3 Drawing Sheets

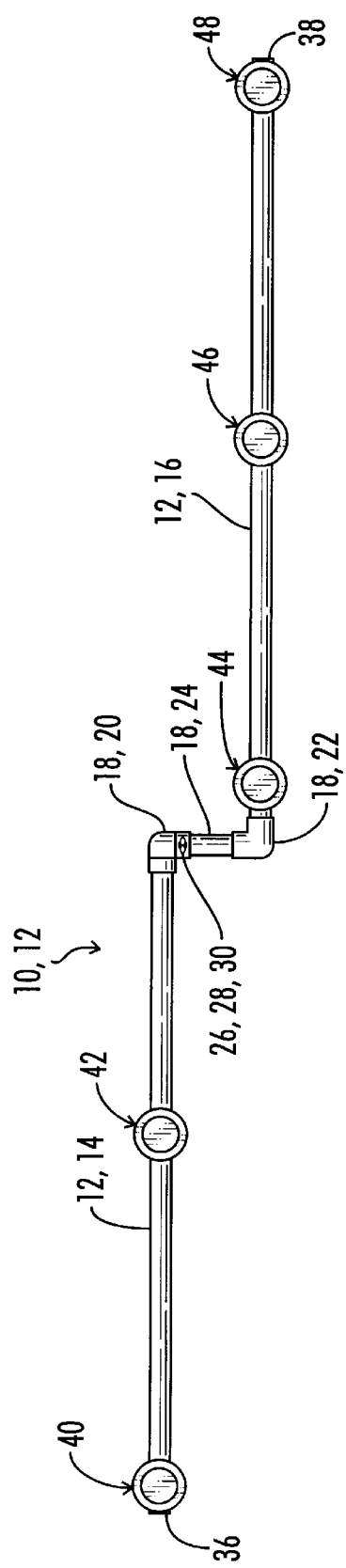
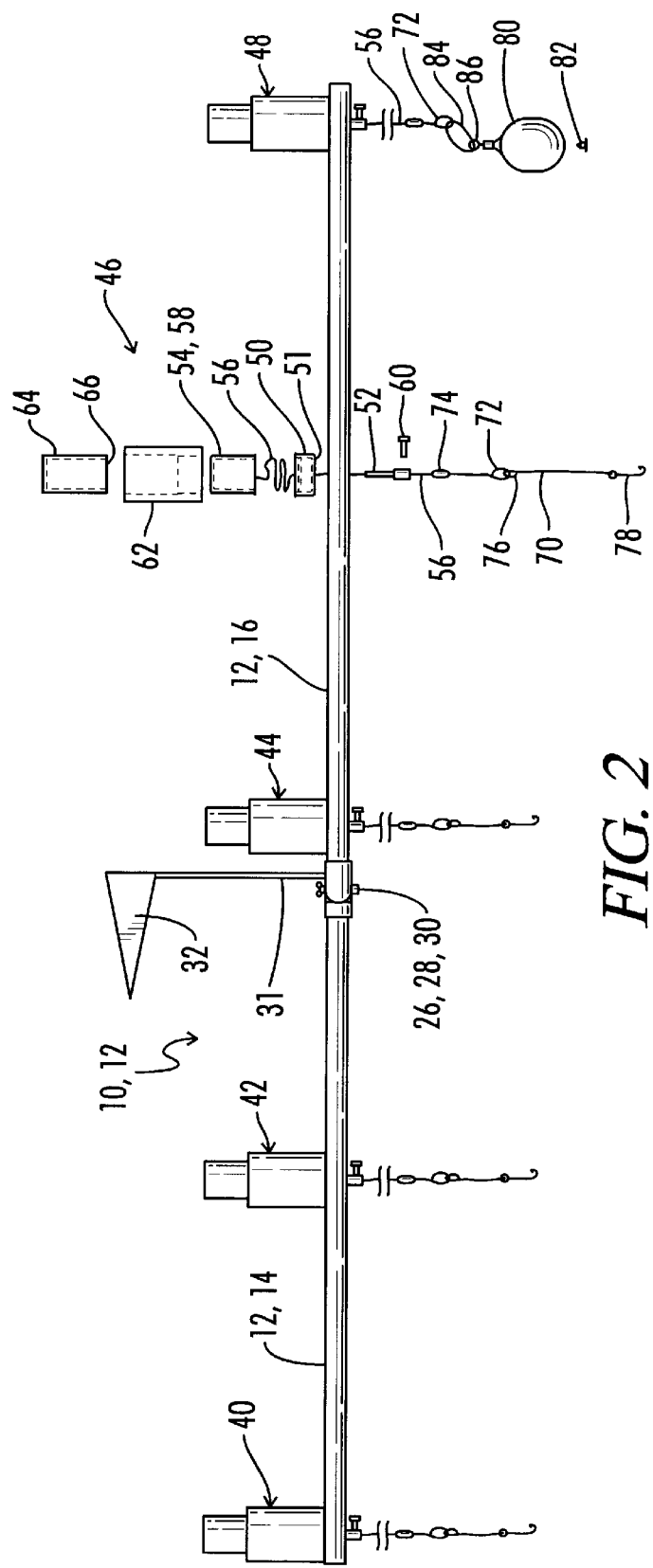

FLOAT FISHING DEVICE

BACKGROUND OF THE INVENTION

1. Field of the Invention

The present invention relates generally to apparatus for fishing, and more particularly, to a floating apparatus which suspends a multiple number of lines therefrom.

2. Description of the Prior Art

One commonly used fishing technique is that referred to as "float fishing" or "jug fishing". Float fishing is a technique whereby a device, floating on the water, is used to retain a line that holds the hook and an anchor if desired. Typically a one gallon size plastic container is used for the float, thus the term "jug fishing".

The use of plastic jugs for float fishing provides a minimal cost apparatus, however, many factors make this method inconvenient.

For example, the depth at which the hook will be located is fixed by the length of the line attached to the jug. To change fishing depth, it is necessary to retie the line at a different length.

Also, it is often desirable to anchor the jug so that it remains in a fixed location. This may be accomplished by an additional length of line below the hook, with that additional length of line being tied to an anchor. This extra line adds to the inconvenience of this technique as it tends to become entangled with a hook. If a separate anchor line is used, the problem of entanglement is even greater since there are now two lines to contend with.

Another problem with conventional jug fishing is that when retrieving the line for travel, there is no convenient way to store the line without entanglement.

Typically when jug fishing, more than one line is desired. This requires additional jugs and lines for each hook. Due to the natural movement of the jugs on the water, it is necessary to position the jugs at a distance to prevent entanglement. This may cause additional jugs to be located away from the desired fishing spot.

Such multiple jug locations also increase the chance of the fisherman encroaching upon sites other people may have selected.

Also, jugs of the type commonly used are not highly visible, which increases the hazard to boating and skiing. Also, the low visibility makes locating the jugs more difficult upon returning to check the hooks.

It is often desirable to allow the jugs to float with the current. This makes multiple jugs especially inconvenient due to the scattering effect and the probability of entanglement.

Thus, it is seen that there is a need in the art for improved techniques of float fishing which eliminate the problems described above which are encountered with conventional jug fishing.

SUMMARY OF THE INVENTION

A fishing apparatus in accordance with the present invention includes a buoyant collapsible pole assembly. The pole assembly includes first and second elongated buoyant poles and a swivel connection between the poles so that the poles can pivot between an extended position wherein the poles extend in opposite positions from the swivel connection, and a folded position wherein the poles extend in the same direction from the swivel connection. When in the folded position, the pole assembly is easily transported. A plurality of line and storage dispensing stations are attached to the pole assembly at spaced locations along the pole assembly.

It is therefor an object of the present invention to provide an improved apparatus for float fishing.

Another object of the present invention is to provide a float fishing apparatus which may be folded up for easy transport.

Still another object of the present invention is the provision of a float fishing apparatus which includes a line storage and dispensing station which allows the line to be stored without entanglement while the apparatus is being moved.

Still another object of the present invention is the provision of a system whereby the depth of the line extending below the float may be easily adjusted.

And another object of the present invention is the provision of a float fishing apparatus having an anchor.

Yet another object of the present invention is the provision of the float fishing apparatus which is easily visible.

Another object of the invention is to provide a float fishing apparatus that includes storage for hooks, line and sinkers.

Other and further objects, features and advantages of the present invention will be readily apparent to those skilled in the art upon the reading of the following disclosure when taken in conjunction with the accompanying drawings.

BRIEF DESCRIPTION OF THE DRAWINGS

FIG. 1 is a plan view of the float fishing apparatus in an extended operating position.

FIG. 2 is a side elevation view of the apparatus of FIG. 1.

DESCRIPTION OF THE PREFERRED EMBODIMENTS

Figure 3:
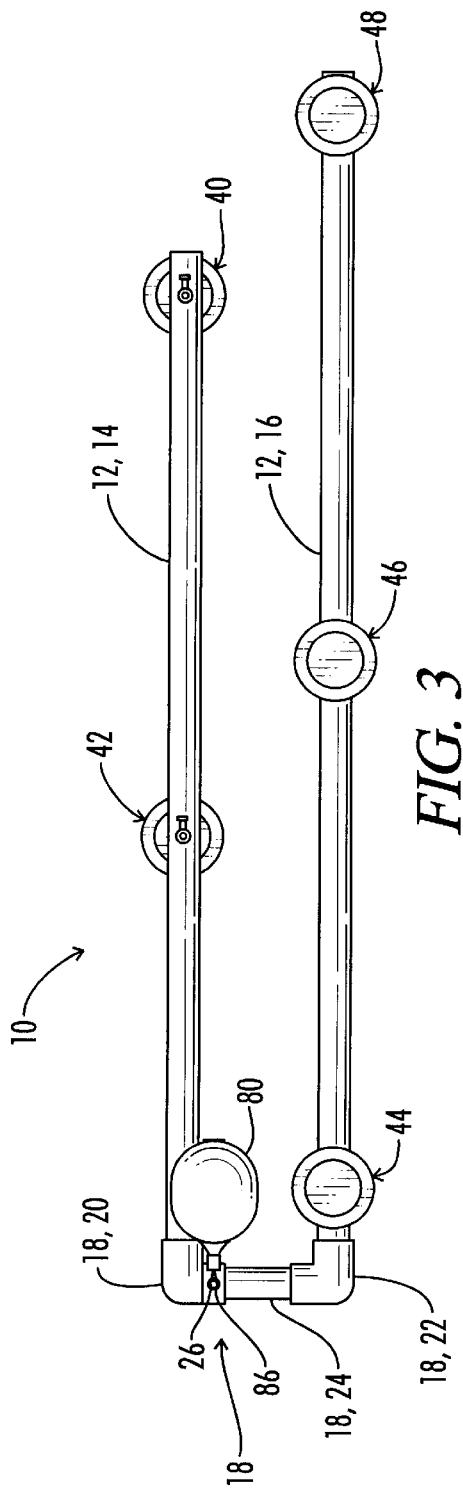
FIG. 3 is a plan view of the float fishing apparatus of FIG. 1 having been folded up into its transport position.

Referring now to the drawings, and particularly to FIGS. 1 through 4, the float fishing apparatus of the present invention is shown and generally designated by the numeral 10. The apparatus 10 includes a buoyant collapsible pole assembly 12 which includes first and second elongated buoyant poles 14 and 16.

The pole assembly 12 further includes a pivotal connection 18 between the first and second poles 14 and 16. The pivotal connection 18 is comprised of first and second elbows 20 and 22 attached to the interior ends of first and second poles 14 and 16, respectively. The pivotal connection 18 further includes a cross piece 24 extending between the two elbows 20 and 22.

The first and second pole pieces 14 and 16, the elbows 20 and 22 and the cross piece 24 are all constructed from extruded tubular plastic members and molded plastic fittings. These pieces may be round or other cross-sectional shape. The elbows 20 and 22 are rigidly attached to the poles 14 and 16 such as by gluing, welding or the like. The cross piece 18 is rigidly attached to second elbow 22, but is rotatably received within the elbow 20 so as to allow pivotal movement.

A lock 26 is provided for locking the pivotal connection 18 when the pole assembly 12 is in either its extended or folded position. The lock includes complementary lock receiving holes 28 extending diametrically through the elbow 20 and cross piece 24, and a bolt 30 disposed through the holes 28. The bolt is held in place within the bolt holes 28 by a wingnut 34 (See FIG. 4).

Figure 4:
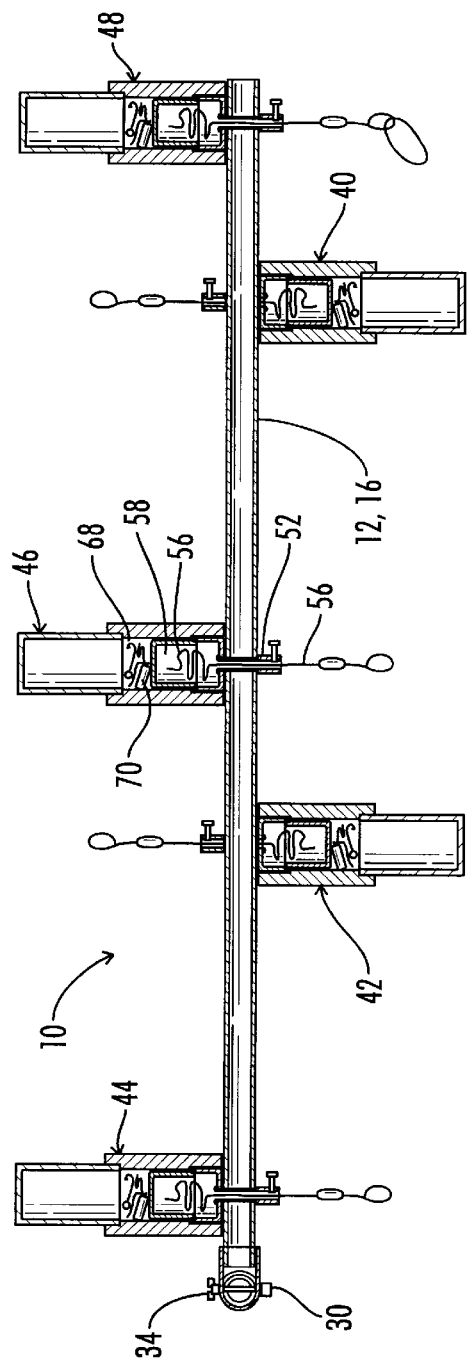
FIG. 4 is a side elevation view of the apparatus of FIG. 3, with the line storage and dispensing stations being shown in cross section so that the storage locations of the fishing lines and the leader and hook assemblies are readily seen.

The pivotal connection 18 may be described as a pivotal connection between first and second poles 14 and 16 so that the poles can pivot between an extended position as shown in FIGS. 1 and 2 wherein the poles extend in opposite directions from the pivotal connection 18, and a folded position as shown in FIGS. 3 and 4, wherein the poles extend in the same direction from the pivotal connection. As is apparent in FIG. 4, the first pole 14 is shorter than the second pole 16.

As best seen in FIG. 2, a flagpole 31 may be provided to carry a pennant 32, or a reflector or other device which is readily visible to the operator of the fishing apparatus.

The entire pole assembly is preferably filled with a closed cell plastic foam material to prevent the poles from filling with water and to increase the buoyancy of the pole assembly.

Preferably the outer ends 36 and 38 of first and second poles 14 and 16 are closed with a plastic cap to exclude water from the poles. The pole assembly 12 is preferably manufactured from a brilliant color plastic such as yellow or orange to make it easily visible.

A plurality of line storage and dispensing stations are attached to the pole assembly 12 at spaced locations along the pole assembly 12. In the embodiment illustrated, there are five such stations which have been designated by the numerals 40, 42, 44, 46 and 48. Station 46 is shown in an exploded view in FIG. 2 to further illustrate the various components thereof.

Figures 5, 6:
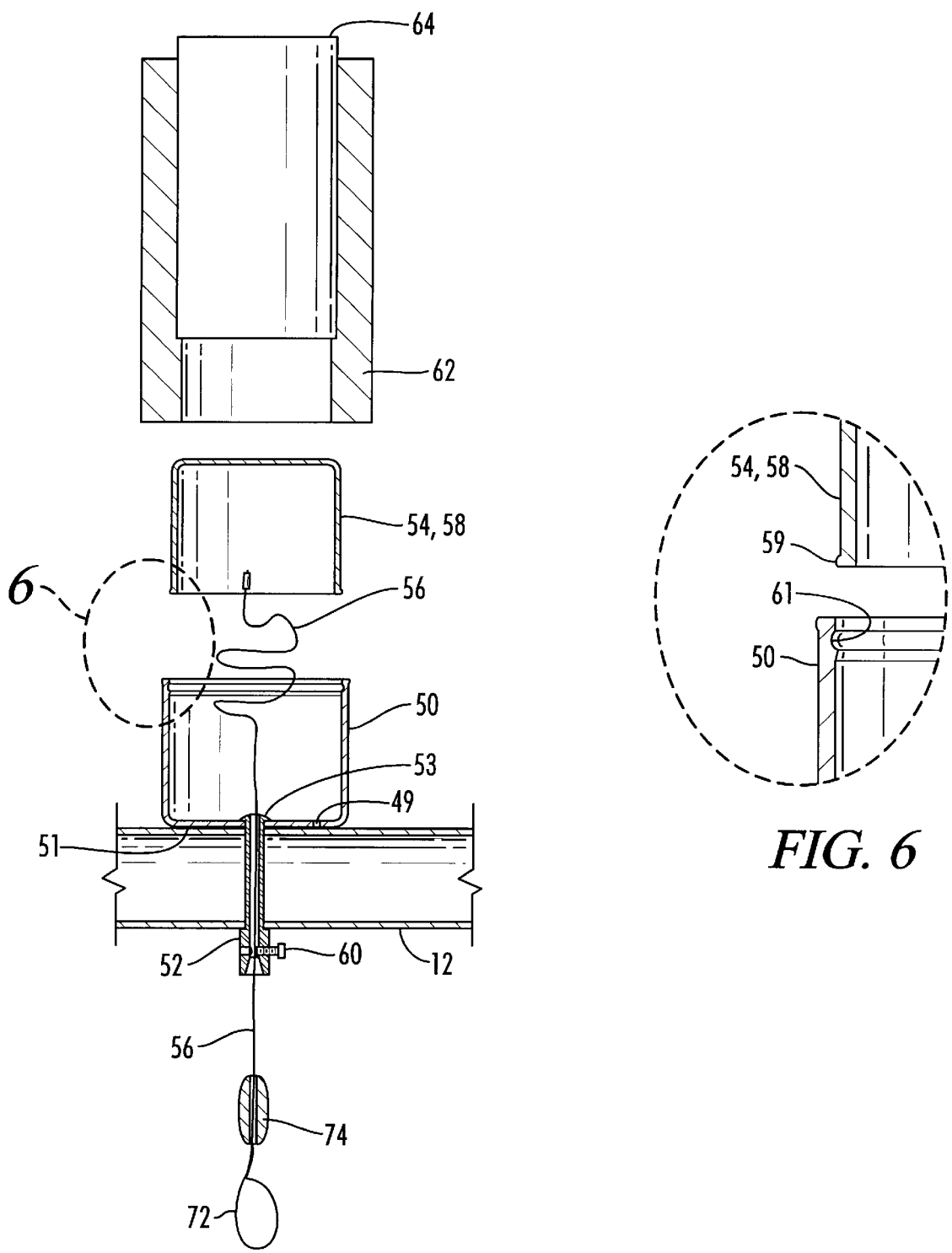
FIG. 5 is an enlarged elevation section view of one of the line storage and dispensing stations.
FIG. 6 is an enlarged exploded view of a portion of the line cup and line cone circled in FIG. 5, to show the resilient lip and groove locking means therebetween.

The details of construction of each of the stations are best shown with regard to the exploded view of station 46 in FIG. 2, and the enlarged cross sectional view of station 46 shown in FIG. 5.

Each station includes a line cup 50 which is attached to the pole assembly 12 by a line controller 52. The line controller 52 is a hollow fitting which extends upward through a diametrical hole through the pole 16 and through a center hole in a bottom wall 51 of the cup 50. The hollow fitting 52 is attached to the cup 50 by a one-way push-on retainer 53. Thus, by means of the hollow fitting 52, which is also the line controller 52, the line cup 50 is fastened to the pole 16.

The bottom wall 51 has one or more drain holes 49 formed therein.

A line cone 54 is an inverted cuplike member open at the bottom and closed at the top. The line cone 54 is received within the line cup 50 in a snapfit between a dimple and a protrusion on the line cup and line core, so that the two may be readily disassembled and reassembled.

The snap fit assembly is best shown in the enlarged view of FIG. 6. The line cone 58 has an annular locking lip 59. The line cup 50 has an annular locking groove 61. The line cone 58 and line cup 50 are constructed from a resilient plastic material, and are dimensioned so that the lip 59 will snap fit into the groove 61 to retain the parts in position relative to each other. The line cone 58 can be removed by exerting a sufficient upward force on it to dislodge lip 59 from groove 61.

A length of fishing line 56 is coiled within the compartment 58 defined by the line cup 50 and line cone 54. The compartment 58 serves as a compartment for storage of the fishing line 56 both during storage and transport, and during operation.

A crimp sleeve or knot is provided in the upper end of fishing line 56 to prevent it from being pulled entirely through the hollow bolt 52

During operation of the device, a portion of the fishing line 56 is fed downward through the hollow line controller 52 to a desired depth. When the desired length of line 56 extends below the controller 52, the line 56 is fixedly clamped to the controller 52 by a clamp screw 60 which threads into a radial bore defined in the line controller 52 so as to clamp the fishing line 56 against the inner bore of the hollow screw 52.

Closely received in a snug friction fit about the cylindrical outer surface of both the line cone 54 and line cup 50 is a cylindrical outer float 62 which is preferably constructed from a foamed plastic material. Received within the upper end of outer float 62 is a cylindrical inner float 64 which is also preferably constructed from a foamed plastic material. The inner float 64 is a snug friction fit within the outer float 40 and its lower end 66 is spaced somewhat above the upper end of line cone 58 to define a second compartment 68 which is best seen in FIG. 4, for storing a leader and hook assembly 70 when the device is being transported.

As best seen in FIG. 2, when the apparatus 10 is in operation, each of the fishing lines 46 is extended to a desired depth below the float assembly 10 and fixed at that depth by its clamp screw 60. The lower end of each fishing line 56 has a loop 72 formed therein and carries a lead sinker 74. The leader and hook assembly 70 is attached to the loop 72 by a snaplock 76 or other conventional connector. A hook 78 is located on the end of the hook and leader assembly 70.

Preferably, one of the line storage and dispensing stations such as station 48 has an anchor 80 attached to its line 56. The anchor 80 is preferably a hollow plastic member which may be filled with a material such as sand to provide weight. The sand is retained by means of a plug 82.

The anchor 80 is connected to the loop 72 of line 56 by a split linkage 84 which fits through an eye bolt 86 attached to the anchor 80. This allows the anchor 80 to be readily removed for transport.

As is best seen in FIG. 3, the anchor 80 may be readily stored during transport by fitting the eye bolt 86 through the upstanding bolt 26.

Although the apparatus 10 is preferably constructed to be foldable as illustrated, it will be appreciated that certain aspects of the invention, such as the spaced line dispensing and storage stations 40–48 could be utilized with a rigid floating pole which was not hinged or foldable.

MANNER OF OPERATION

The apparatus 10 is utilized in the following manner.

The apparatus will first be arranged in the orientation shown in FIGS. 3 and 4 for transport to the fishing site. In the transport position, the anchor is held in place by bolt 26. Each of the fishing lines 56 is stored in its respective compartment 58 with only a short length thereof extending through the hollow fitting 52. Each of the leader and hook assemblies 70 is safely stored in second compartment 68. The pole assembly is rigidly held in its folded position by the bolt 26.

After transporting the apparatus 10 to the fishing site, the pole assembly 12 is moved to its extended position by removing the bolt 26, rotating the first pole piece 14 relative to the second pole piece 16 to the extended position shown in FIG. 1, and then replacing the bolt 26 so as to rigidly connect the elbow 20 to the cross piece 24.

The apparatus 10 is placed in the water after being unfolded to its extended position.

Then, each of the fishing lines 56 is extended to a desired length. Its associated leader and hook assembly 70 is removed from the second compartment 68 and attached to loop 72 as shown in FIG. 2. The anchor 80 is removed from bolt 26 and attached to the connector 84 of the line 56 associated with the storage and dispensing station 48.

The apparatus 10 may either be allowed to drift through the water, or the line 56 associated with anchor 80 may be lowered to a sufficient depth that the anchor 80 rests upon the bottom of the lake or river so as to anchor the system 10.

When it is desired to move the system 10 or to store it, the process described above is reversed. The leader and hook assembly 70 are removed and placed in the second compartment 68 of their associated storage and dispensing station. The fishing line 56 is pulled up into its storage compartment 58. The anchor 80 is removed and after folding the pole assembly 12 to the folded position of FIG. 3, the anchor 80 is attached to bolt 26 which rigidly holds the pole assembly 12 in its folded position.

If it is desired to simply move the system 10, the fishing lines 56 may each be retracted into their compartments 58 without removing the leader and hook assembly 70 and without even removing the bait from the hooks 78. Then the system 10 can be towed or carried to the next location.

The system 10 provides floatation by highly visible and/or reflective components to provide safety and ease of locating the apparatus. The five line storage positions are constructed from foamed plastic parts that not only provide buoyancy, but also create spaces for line storage.

The system 10 provides a compact multi-position fishing device that is convenient to use and carry. The line separation provided by the separation distance between the stations 40 through 48 allows multiple lines to be fished in a small area.

The foldable construction of the pole assembly 12 allows for compact storage while still providing separation of the four fishing lines and the anchor line during use.

At each of the five line storage and dispensing locations, the compartmentalized containers provide for storage of the lines and leaders. The lower part of each container with its associated line controller device 52 allows the line length and thus the hook fishing position to be easily adjusted and held to a desired depth. This feature allows each hook to be individually set to the desired depth for that hook.

For increased visibility, novelty and sales appeal, a reflector or pennant 32 can be incorporated.

Thus, it is seen that the apparatus and methods of the present invention readily achieve and ends and advantages mentioned as well as those inherit therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A fishing apparatus, comprising:
   a buoyant collapsible pole assembly being sufficiently buoyant to float on the surface of water when in use, including:
   a first elongated buoyant pole;
   a second elongated buoyant pole;
   a pivotal connection between the first and second poles so that the poles can pivot between an extended position wherein the poles extend in opposite directions from the pivotal connection, and a folded position wherein the poles extend in the same direction from the pivotal connection; and
   a plurality of line storage and dispensing stations attached to the pole assembly at spaced locations along the pole assembly.

2. the apparatus of claim 1, wherein:
the poles are tubular poles filled with foam plastic.

3. The apparatus of claim 1, further comprising:
an anchor attachable to the line from one of the line storage and dispensing stations; and
an anchor storage attachment on the anchor which allows the anchor to be rigidly attached to the pole assembly for storage and transport.

4. The apparatus of claim 1, further comprising:
an upward extending position marker mounted on the pole assembly.

5. A fishing apparatus, comprising:
a buoyant collapsible pole assembly, including:
   a first elongated buoyant pole;
   a second elongated buoyant pole;
   a pivotal connection between the first and second poles so that the poles can pivot between an extended position wherein the poles extend in opposite directions from the pivotal connection, and a folded position wherein the poles extend in the same direction from the pivotal connection; and
   a plurality of line storage and dispensing stations attached to the pole assembly at spaced locations along the pole assembly; and
   wherein the pivotal connection includes:
      first and second elbows attached to the first and second poles, respectively;
      a cross-piece extending between the first and second elbows; and
      a lock for locking the pivotal connection when the pole assembly is in either of its extended and folded positions.

6. The apparatus of claim 5, wherein:
the elbows are tubular fittings, and the cross-piece is a tubular cross-piece; and
the lock includes complementary lock holes extending diametrically through the cross-piece and one of the elbows, and a bolt received through the lock holes.

7. A fishing apparatus, comprising:
a buoyant collapsible pole assembly, including:
   a first elongated buoyant pole;
   a second elongated buoyant pole;
   a pivotal connection between the first and second poles so that the poles can pivot between an extended position wherein the poles extend in opposite directions from the pivotal connection, and a folded position wherein the poles extend in the same direction from the pivotal connection; and
   a plurality of line storage and dispensing stations attached to the pole assembly at spaced locations along the pole assembly; and
   wherein each of the line storage and dispensing stations includes:
      a compartment for storing a length of fishing line; and an adjustable line length controller for fixing a length of the fishing line which extends from the compartment.

8. The apparatus of claim 7, wherein:

the compartment has a bottom wall with an opening defined therein;

the controller includes a hollow tube extending downward from the opening in the bottom wall of the compartment, so that the fishing line can extend down from the compartment through the hollow tube; and each line storage and dispensing station further includes a clamp, associated with the hollow tube, for clamping the fishing line to the hollow tube to fix the length of the line below the compartment.

9. The apparatus of claim 7, wherein each of the line storage and dispensing stations further includes:

a second compartment, separate from the first compartment, for storing a leader and hook during storage or transport of the apparatus.

10. The apparatus of claim 7, wherein each of the line storage and dispensing stations further comprises:

a cylindrical hollow outer float, having the compartment defined therein; and a cylindrical inner float detachably received within the outer float.

11. A fishing apparatus, comprising:

an elongated collapsible rigid float constructed to float in a generally horizontal orientation, the float having a length;

a plurality of fishing lines attached to the float and spaced along the length thereof;

a plurality of line storage and dispensing stations attached to the float, each one of the stations being associated with one of the lines;

wherein each of the stations includes a compartment for storing the associated fishing line, and an adjustable line length controller for fixing a length of the fishing line which extends from the compartment.

12. The apparatus of claim 11, wherein each of the stations further comprises:

a second compartment, separate from the first compartment, for storing a leader and hook during storage or transport of the apparatus.

13. A fishing apparatus, comprising:

an elongated rigid float constructed to float in a generally horizontal orientation, the float having a length;

a plurality of fishing lines attached to the float and spaced along the length thereof;

a plurality of fishing line storage and dispensing stations attached to the float, each one of the stations being associated with one of the fishing lines, each one of the stations including a compartment for storing the associated fishing line, and an adjustable line length controller for fixing a length of the fishing line which extends from the compartment;

wherein the compartment has a bottom wall with an opening defined therein;

wherein the controller includes a hollow tube extending downward from the opening in the bottom wall of the compartment, so that the fishing line can extend down from the compartment through the hollow tube; and wherein each storage and dispensing station further includes a clamp, associated with the hollow tube, for clamping the fishing line to the hollow tube to fix the length of the line below the compartment.

14. A fishing apparatus, comprising:

an elongated rigid float constructed to float in a generally horizontal orientation, the float having a length;

a plurality of fishing lines attached to the float and spaced along the length thereof;

a plurality of line storage and dispensing stations attached to the float, each one of the stations being associated with one of the fishing lines, and each one of the stations including a compartment for storing the associated fishing line and an adjustable line length controller for fixing a length of the fishing line which extends from the compartment;

wherein each of the line storage and dispensing stations further includes:

a cylindrical hollow outer float, having the compartment defined therein; and a cylindrical inner float detachably received within the outer float.

* * * * *